United States Patent [19]

Sinha

[11] Patent Number: 4,480,468
[45] Date of Patent: Nov. 6, 1984

[54] APPARATUS FOR MEASURING AND INDICATING THE FLUID LEVEL IN VESSELS

[76] Inventor: Brajnandan Sinha, 17 Tunnlandsvägen, S-175 46 Järfälla, Sweden

[21] Appl. No.: 395,017

[22] PCT Filed: Oct. 28, 1981

[86] PCT No.: PCT/SE81/00318
§ 371 Date: Jun. 21, 1982
§ 102(e) Date: Jun. 21, 1982

[87] PCT Pub. No.: WO82/01584
PCT Pub. Date: May 13, 1982

[30] Foreign Application Priority Data
Oct. 29, 1980 [SE] Sweden .................................. 8007596

[51] Int. Cl.$^3$ ............................................. G01F 23/28
[52] U.S. Cl. ................................................. 73/290 V
[58] Field of Search ............. 73/290 V, 590, 52, 32 A

[56] References Cited
FOREIGN PATENT DOCUMENTS
89021  7/1981  Japan ................................. 73/290 V
422967 9/1974  U.S.S.R. ........................... 73/290 V Primary Examiner—S. Clement Swisher
Assistant Examiner—Joseph W. Roskos
Attorney, Agent, or Firm—Cushman, Darby & Cushman

[57] ABSTRACT

The invention relates an apparatus for measuring and indicating the fluid level in a vessel, such as larger LP-gas tubes for household purposes.

A pulse device is used for causing the vessel wall to vibrate, for example by causing a striking pin momentarily to thrust against the wall, and for scanning the oscillation frequency of the wall varying with the filling degree of the vessel. A transducer is provided which, for example, is a piezoelectric element abutting the wall. The output signal from the element is passed to a processing unit for evaluating the signal, and the result is passed to an indicator, which may be of the analog or digital type.

10 Claims, 7 Drawing Figures

APPARATUS FOR MEASURING AND INDICATING THE FLUID LEVEL IN VESSELS

This invention relates to an apparatus for measuring and indicating the fluid level in vessels.

The liquid level in non-transparent vessels heretofore has been indicated by means of stand pipes (for example at boilers) or floating bodies (for example at oil or gasoline tanks). At other vessels or containers, such as LP-gas tubes or bottles for household purposes or the like, level indication was not provided at all. In order to find out the filling degree, one had to weigh the vessel with contents, which obviously can be a complicated and troublesome procedure especially when the vessels are large and heavy.

The present invention offers a solution of the indication problem without any encroachment in the vessel. The invention is characterized by a mechanically operating arrangement or a pulse device for causing the vessel wall to vibrate, a transducer for sensing the vibration progress varying with the filling degree of the vessel, and a processing unit for evaluating the output signal of the transducer and transmitting the result to an indicator.

Figure 1:
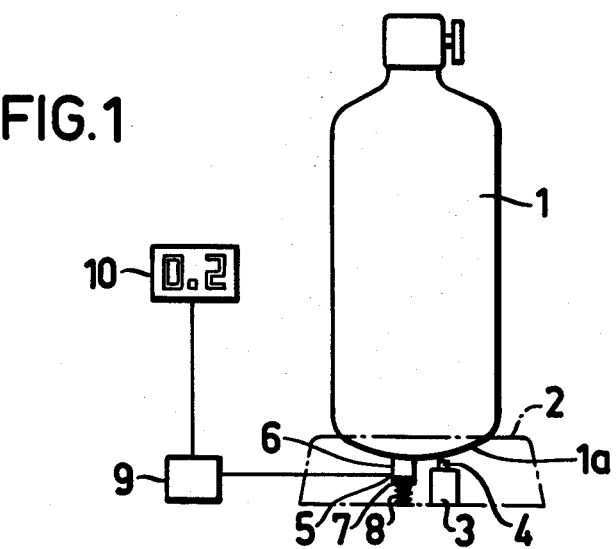
Figure 2:
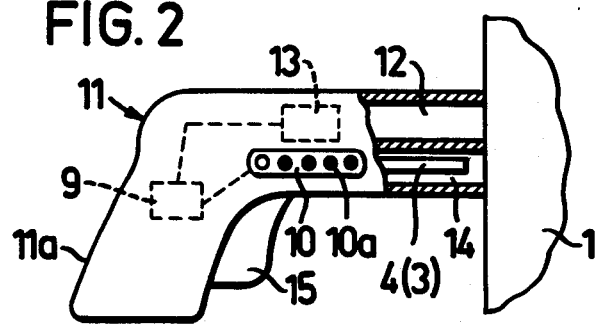
Figure 3:
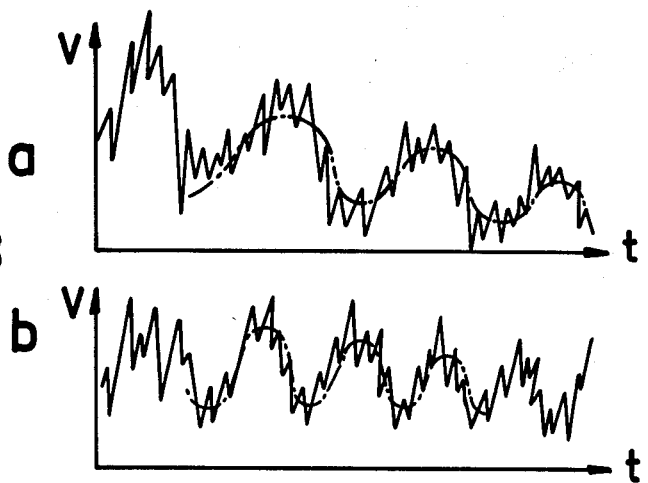
Figure 4:
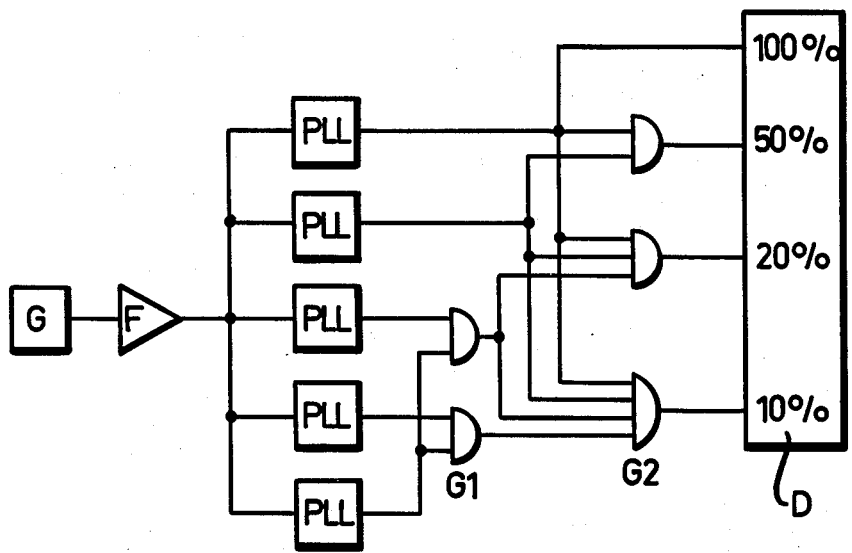
Figure 7:
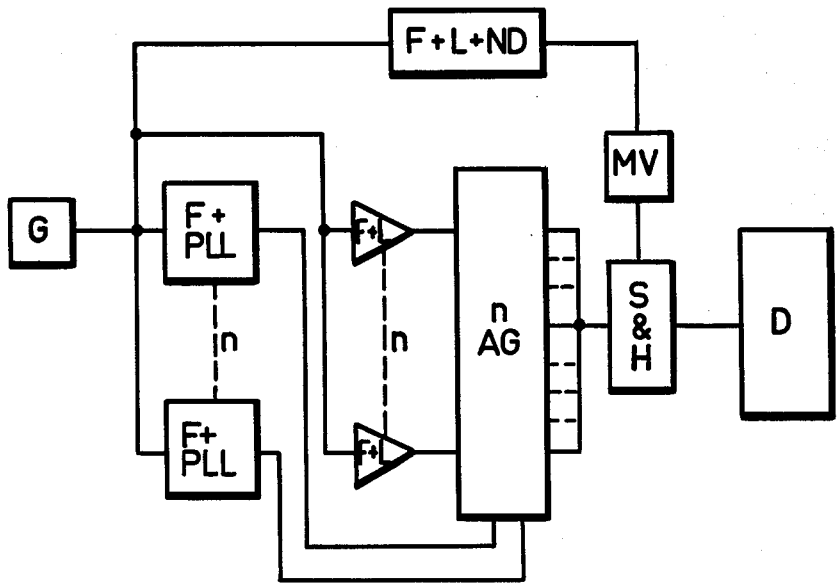
Figure 5:
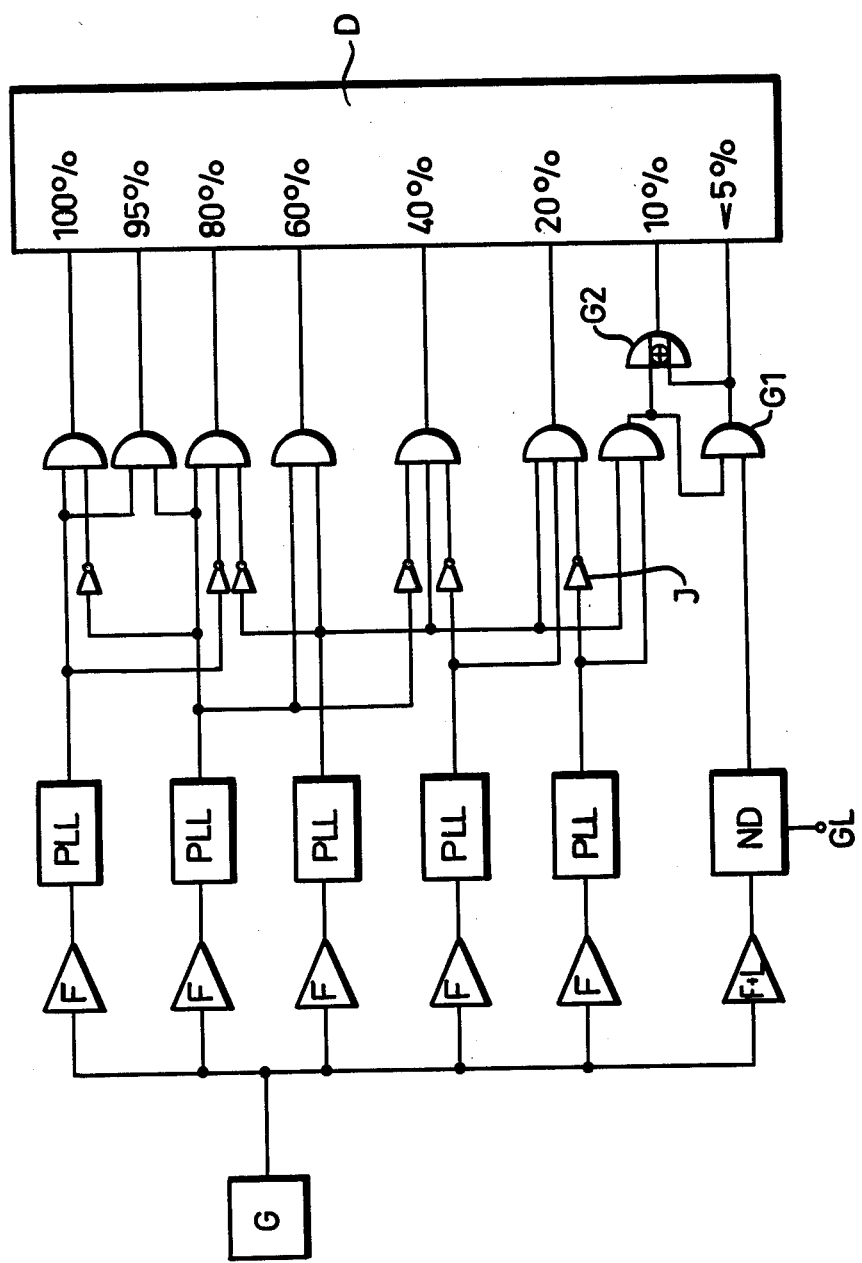
Figure 6:
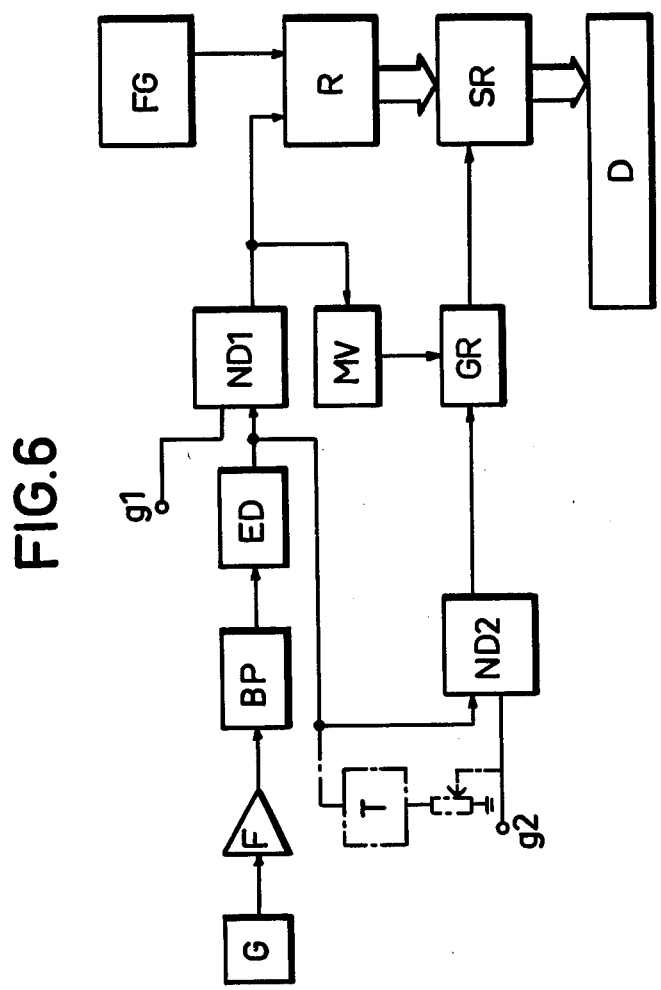

The invention is described in greater detail in the following where it is applied to an LP-gas tube and reference is made to the accompanying drawings, in which FIG. 1 is a schematic front view of a LP-gas tube for household purposes, equipped with a stationary apparatus according to the invention, shown partially in block form, FIG. 2 is a view of an apparatus designed as a separate accessory to be held in the hand and formed as a pistol, part of its casing cut-off, FIGS. 3a,b are typical curves of the output signal from the transducer of the apparatus at full and, respectively, empty tube, FIGS. 4,5 and 6 are block diagrams for the electric arrangement with digital indication by using only the frequency of the tube wall (FIG. 4), a combination of the frequency of the tube wall and its vibration amplitude (FIG. 5), and the reverberation time of the wall vibration (FIG. 6), and FIG. 7 is the block diagram for an arrangement with analogous indication.

The LP-gas tube 1 in FIG. 1 rests on a support 2, indicated by dash-dotted lines. In the support a stationary pulse device 3 with striking pin 4, and to the side of the device a transducer generally designated by 5 are carried. The transducer comprises a piezoelectric crystal 6, which is movable in vertical direction and carries upwardly a mass weight 7, which is influenced by an upward directed force, which here is represented by a compression spring 8. The pulse device and the transducer are so located in the support 2, that the bottom wall 1a of the applied tube 1 will be located within the stroke length of the device and compresses the spring 8 so that an intimate contact with the crystal 6 is ensured.

The output signal from the transducer 5 is passed to a processing unit 9 and therefrom to an indicator 10.

The mode of operation substantially is as follows:

The striking pin 4 of the pulse device is released, for example by pressing a button (not shown), which releases a prestress, which acts on the pin—and possibly is generated at the beginning of said pressing—so that the bottom of the tube is subjected to a forceful thrust. Thereby the entire tube wall 1 is caused to perform decaying vibration. The LP-gas amount in the tube exercises a damping effect on this vibration which decreases with decreasing amount. This implies increased vibration frequency and decreasing amplitude.

The vibrations of the wall (bottom) are transferred by the piezoelectric transducer 5 in the form of a correspondingly varying voltage to the processing unit 9, which processes the signal and emits a signal to the indicator 10 which is related to the frequency (or amplitude) and thereby to the filling degree of the tube. The indicator 10 then indicates the LP-gas level, for example in the form of a pointer deflection or in digital manner (as in the Figure).

The mechanical releasable prestress of the striking pin 4 can be replaced by electro-dynamic switching-on or application of a strong voltage pulse on a fixed piezoelectric crystal, which carries the striking pin, or on a winding about a magnetostrictive rod having its end close to or in contact with the tube bottom.

The transducer 5 in FIG. 1 can be replaced by a microphone positioned at a distance from the tube bottom. The microphone then collects the acoustic waves from the tube and emits a signal to the processing unit which is analogous with the output signal of the piezoelectric crystal.

The microphone alternative is shown applied to the embodiment shown in FIG. 2 where the observation has been utilized that the nature of the output signal of the transducer substantially is independent of the point of attack of the pulse device and transducer on the tube.

The pistol with the general designation 11 and the handle 11a shown in FIG. 2, thus, can be applied in any place of the tube wall. The pistol bore includes a first channel 12 for directing the sound (the acoustic oscillations) to a microphone 13. In a second channel 14 the striking pin is advanced which as in the case of a stapling pistol is actuated by a cock 15.

As in the afore-mentioned case, the output signal of the transducer (microphone 13) is passed to the processing unit 9, which is located in the handle 11a, and the output of which is connected to the indicator 10. The indicator in this case is shown to consist of a table comprised in the pistol shell and provided with glow lamps 10a, which are extinguished successively for indicating in steps the falling level in the tube. In FIGS. 1 and 2 is indicated that about 20% of the tube content is still remaining.

FIG. 3a shows the typical form of the output signal from the transducer at full tube, and 3b at emptied tube at the arrangement according to FIG. 1. It should be observed, however, that these curves also are representative for the microphone alternative according to FIG. 2.

As certain unwarranted transients may arise just at the moment of thrust, preferably a time delay can be inserted before the processing of the signal in the processing unit. The processing can be carried out in different ways obvious to the expert. Normally, the overtone peaks should first be removed through a low-pass filter, so that the falling sine waves indicated by dash-dotted lines are obtained. The Figures illustrate clearly that the frequency is substantially higher at the curve 3b (empty tube) than at the curve 3a (full tube), and also that the curve 3a falls more rapidly than the curve 3b, in response to the greater damping.

The simplest indication should be obtained by coupling the filtered output signal of the transducer to a frequency meter, which is graduated directly in level values between limit values measured for full and empty tube. Alternatively, the output signal could be rectified and integrated over a definite interval and be compared to a reference value for the same time interval.

In order to render possible measuring and indication on different standard types of vessels, a programmable microcomputer can be inserted for programming the varying types and calibrating in view of tolerances in the wall thickness etc.

The apparatus according to the invention can be used for measuring the level of all fluids, of liquids as well as of gas. Remote control for remote indication at arrangements of the type shown in FIG. 1 does not give rise to problems.

Different combinations and modifications of the arrangement described can be imagined. In principle, the pulse device and transducer should consist of one and the same piezoelectric element, which first causes the vessel wall to vibrate by a voltage surge and thereafter acts as a transducer. The pulse device, further, could be arranged so as instead of a single voltage pulses to emit a series of such pulses, either at intervals exceeding the maximum expected decay time (repeated indication to the extent there is no memory for the indicator), or at intervals falling below the decay time, i.e. the pulse device acts as a vibrator. In this latter case the processing unit must be equipped so as to discriminate between the oscillations overlapping each other, which are represented by the composed output signal of the transducer. This case should occur when, for example, the tube 1 in FIG. 1 is placed on a vibrating support, which should replace the pulse device 3.

This opens the possibility of utilizing the invention also for level indication in gasoline or oil tanks in motor vehicles where the starting of the engine positively gives rise to vibrations in the tank.

Although it should not be difficult for the expert to design the necessary electronic evaluation circuits on the basis of the above directions, for reason of completeness four different solutions are described below by way of example with reference to FIGS. 4–7.

FIG. 4 shows the simplest case, with relatively coarse indication of the filling degree, viz. at 100%, 50%, 20% and 10%. The output signal emitted from the transducer G at thrust against the vessel in question is amplified in a pre-amplifier F for adapting the signal level to circuits of the type PLL (Phase Locked Loop) connected in parallel with adjustable frequency bands corresponding to the different filling degrees. These PLL emit output signals to respective AND-gates G1 and OR-gates G2 when the ingoing frequency lies within their adjusted frequency band. For obtaining the greater accuracy (10%), the frequency bands for two PLL overlap each other, and both circuits must emit an output signal for indicating the level. Through the OR-gates G2 indication on a digital display unit D is obtained.

In the case when greater accuracy is desired or required, especially at almost empty vessel (for which a change in frequency cannot be observed any longer with safety), a coupling according to FIG. 5 can be used where for the critical residual range (less than 10%) the condition is utilized that also the oscillation amplitude of the vessel wall varies with the filling degree (see FIG. 3).

In the circuit according to FIG. 5, PLL in this case designates a sound detector, i.e. a normal PLL which on the same chip has been completed with a comparator, which by digital output signal indicates if an ingoing signal lies within the frequency band in question. For the higher filling degrees the same principle as in FIG. 4 is applied, i.e. with only frequency changes as criterium. The addition in relation to FIG. 4 are substantially individual pre-amplifiers F, preferably with low-pass filter for obtaining a uniform amplitude over the frequency band, more logic and a level detector ND scanning the oscillation amplitude for indicating filling degrees from 10% downward to 0%. A rectifier is comprised in the pre-amplifier F+L of the detector. For 5% or less both the logic for 10% and the level detector must emit an output signal. These two signals pass through an AND-gate G1 and then provide the indication 5% or less on the display unit D. The indication of the 10% level is stopped by means of an exclusive OR-gate G2.

Due to the presence of the level indicator, the thrusts against the vessel are required each time to be carried out with constant force. This conditions does not apply to the frequency detection according to FIG. 4.

If desired, an analogous display of the indication is obtained simply by coupling the output signals of the gates to a digital-analogous converter with connected pointer instrument.

With reference to FIG. 6 the case is described where the indication is based on the reverberation time in response to the filling degree. The oscillation amplitude is damped more rapidly at a higher filling degree than at a lower one (see FIG. 3).

The output signal emitted at thrust against the vessel from the transducer G is passed to a pre-amplifier F, which adapts the signal to correct voltage level. Thereafter a band-pass filter BP filters out a suitable frequency range for the signal, which is rectified in an envelope detector ED. The resulting direct voltage level is transferred to level detectors ND1 and ND2 where the detector ND1 with an upper limit position g1 decides whether or not a thrust was carried out. At thrust, the detector ND1 emits an output signal, which resets a computer R fed from a frequency generator FG for counting-up and via a one-shot MV opens a gate GR, so that an output signal from the level indicator ND2 can pass to a shifter SR. When the input signal from the envelope detector ED due to the damping drops below a definite lower limit level g2 for the detector DN2, the said output signal is emitted to the shifter for edge triggering the same. The shifter then shifts out the value counted up by the computer R to the display unit D directly or via a converter, which re-calibrates the counted value to corresponding filling degree percentage.

When a measurement is desired which is independent of the force of the thrust, the level detector ND2 can be completed with a peak hold circuit T, as indicated by dash-dotting. The peak can be voltage divided and be used as lower limit position g2.

FIG. 7, finally, shows the block diagram for recording n filling degree levels directly in analogous way on the basis of frequency changes. As at the circuit according to FIG. 5 pre-amplifiers F are here provided for each PLL-circuit, and a level detector ND preceded by amplifiers plus rectifier F+L. Further are provided analogous gates (switches or relays) AG, preceded by amplifier plus rectifier F+L in order to emit correct output signal within the associated function range.

Upon thrust, the output signal from the transducer G actuates the PLL-circuit set on the frequency band in question to open the analogous gate AG corresponding to correct filling degree. The output signal from this gate passes to a sample and hold circuit S & H intended to retain the analogous value received and actuated by a one-shot MV in response to the input signal level via the level detector circuit F+L+ND. The result is shown on the analogous display unit D, for example a pointer instrument.

Many different variants of the circuits shown in FIGS. 4–7 are obvious to the expert.

I claim:

1. An apparatus for measuring and indicating the fluid level in vessels comprising a mechanically operating arrangement or a pulse device for initiating a vibration of the vessel wall, a transducer for sensing the oscillation progress varying both in frequency and amplitude with the degree of filling of the vessel, and a processing unit for evaluating the output signal of the transducer and passing the result to an indicator.

2. An apparatus as defined in claim 1, characterized in that the pulse device comprises a strike member driven by a releasable pressure, for example a spring-prestressed pin.

3. An apparatus as defined in claim 1, characterized in that the pulse device is an electric pulse-driven strike member, for example of piezoelectric, magnetostrictive or electrodynamic type.

4. An apparatus as defined in any one of the preceding claims, characterized in that the transducer comprises an inertia-loaded piezoelectric element for application to the vessel wall.

5. An apparatus as defined in claim 1, characterized in that the transducer is a micropone for acoustically scanning the vibrations of the vessel wall at a distance therefrom.

6. An apparatus as defined in claim 1, characterized in that the pulse device and the transducer have a fixed location close to each other so as to form one unit.

7. An apparatus as defined in claim 6, characterized in that the unit is rigidly attached for stationary co-operation with the vessel wall, preferably the bottom wall of the vessel.

8. An apparatus as defined in claim 6, characterized in that the unit is attached separately at the end of a movable handle, for example of pistol shape, for momentary application to the vessel wall in an optional place.

9. An apparatus as defined in claim 1, characterized in that the pulse device, transducer, processing unit and possibly indicator are assembled to one single unit.

10. Apparatus as in claim 1 wherein said transducer output signal includes a frequency component and wherein said processing unit evaluates the frequency component.

* * * * *